US009469025B1

(12) United States Patent
Ostrobrod

(10) Patent No.: US 9,469,025 B1
(45) Date of Patent: Oct. 18, 2016

(54) REMOTE ANCHORAGE INSTALLATION TOOL AND METHOD

(71) Applicant: Meyer Ostrobrod, Philadelphia, PA (US)

(72) Inventor: Meyer Ostrobrod, Philadelphia, PA (US)

( * ) Notice: Subject to any disclaimer, the term of this patent is extended or adjusted under 35 U.S.C. 154(b) by 0 days.

(21) Appl. No.: 14/819,924

(22) Filed: Aug. 6, 2015

(51) Int. Cl.
*A47F 13/06* (2006.01)
*B25J 1/04* (2006.01)

(52) U.S. Cl.
CPC ........................................ *B25J 1/04* (2013.01)

(58) Field of Classification Search
CPC ................ B25J 1/00; B25J 1/02; B25J 1/04; A62B 1/18
USPC ............................................. 414/800; 294/24
See application file for complete search history.

(56) References Cited

U.S. PATENT DOCUMENTS 607,117 A * 7/1898 Loos .......................... B25J 1/04 248/261
807,117 A * 12/1905 Loos .................... C07D 491/04 548/302.1
5,622,399 A * 4/1997 Albright .................. A62B 1/18 294/24

OTHER PUBLICATIONS

DB Industries, Inc., User Instruction Manual First-Man-Up Remote Anchorage Connector System, 1995, 1999, pp. 1-20, USA.

* cited by examiner

*Primary Examiner* — Patrick Maestri
(74) *Attorney, Agent, or Firm* — Norman E. Lehrer

(57) ABSTRACT

A tool for setting an anchor at an elevated overhead position over a horizontal structural member wherein the anchor includes a length of webbing with a ring at each end. The tool includes a vertically extending adjustable length pole having a handle at the bottom and an elongated adapter at the top. The adapter has one end connected to the top of the pole and is movable between a position where it is in axial alignment with the pole and a position where it is perpendicular to the pole. A hook extends from the free end of the adapter and is capable of engaging the rings. A pair of spaced apart pins extends outwardly from the adapter to support the webbing when the adapter is perpendicular. With the webbing in place, the adapter is positioned over the support and maneuvered by lowering or tilting the same so that the webbing comes off of the pins and onto the support. Using the hook, one ring is then drawn through the other to provide an anchor.

6 Claims, 4 Drawing Sheets

REMOTE ANCHORAGE INSTALLATION TOOL AND METHOD

BACKGROUND OF THE INVENTION

The present invention is directed toward a remote anchorage tool and method and more particularly, toward such a remote anchorage installation tool that assists a worker in properly placing a webbing sling or strap over an overhead beam or similar anchor to support the worker along with a personal fall arrest system.

When a workman is working in high places in buildings and other structures, OSHA and the safety rules and regulations in most states and foreign countries require the use of a personal fall arrest or protection device. Such devices protect a workman from injury by quickly slowing and then stopping further downward motion in the event the workman falls from an elevated position. Such fall protection devices are, per se, well known in the art. See, for example, U.S. Pat. No. 4,511,123 and U.S. Pat. No. 5,829,548 both of which issued to the present applicant. The entire contents of these prior parents are incorporated herein by reference.

In use, the workman wears a harness which is connected to a retractable cable coming from the fall protection device. In order for the system to operate properly, however, the cable must extend downwardly from a position above (or at least at or near the height) where the workman is working. This requires that either the fall protection device or at least a pulley for the cable be located at an elevated position above the workman.

Unfortunately, there are many situations where there simply is no anchor or like in the vicinity of where the fall protection device or cable pulley must be located. Frequently, there is nothing present but overhead rafters or beams or similar structures. A solution to this problem is to hang a strap over the beam and use the strap as an anchor point. The strap is comprised of a length of strong webbing or other flexible fabric material that has a D-ring or O-ring at each end. One of the rings is larger than the other. After the strap is hung over the beam, the smaller ring is passed through the larger one. The smaller ring becomes the anchor point.

The problem still exists, however, as to how to get the strap in position over the beam. Climbing a ladder to place the strap in position creates more of a safety problem and obviously makes the situation even more dangerous.

One solution to the problem of placing the strap in position has been proposed by DB Industries, Inc. of Red Wing, Wis., which it sells under the name "First-Man-Up Remote Anchorage Connector System." The DBI system utilizes a rather complex rod or arm at the top of an elongated extendible pole. The strap is carried by the arm and a somewhat complex operating system releases the strap from the arm and places it on the beam. While this system works, it is not easy to use and can malfunction, making it difficult to properly place the strap. Because of the arrangement of the arm and pole, it can also be difficult and awkward to maneuver the smaller ring through the larger one using the DBI system.

A need exists, therefore, for a tool that makes it easy for a worker from the ground to quickly place a support strap carrying rings at it ends onto an overhead beam in order to create an anchor point for a fall protection device for a workman.

SUMMARY OF THE INVENTION

The present invention is designed to overcome the deficiencies of the prior art discussed above. It is an object of the present invention to provide a tool that can attach an anchor to an overhead support from the ground.

It is another object of the present invention to provide a tool that can quickly and easily attach an anchor to an overhead support while remaining safely on the floor or ground and which is easy to operate.

It is a still further object of the present invention to provide such a tool that can also be used to easily remove the anchor while remaining safely on the floor or ground level.

In accordance with the illustrative embodiments demonstrating features and advantages of the present invention, there is provided a tool for setting an anchor at an elevated overhead position over a horizontally extending structural member wherein the anchor includes a length of webbing with a ring at each end. The tool includes a vertically extending adjustable length pole having a handle at the bottom and an elongated adapter at the top. The adapter has one end connected to the top of the pole and is movable between a position where it is in axial alignment with the pole and a position where it is perpendicular to the pole. A hook extends from the free end of the adapter and is capable of engaging the rings. A pair of spaced apart pins extends outwardly from the adapter to support the webbing when the adapter is perpendicular. With the webbing in place, the adapter is positioned over the support and maneuvered by lowering or tilting the same so that the webbing comes off of the pins and onto the support. Using the hook, one ring is then drawn through the other to provide an anchor.

Other objects, features, and advantages of the invention will be readily apparent from the following detailed description of the preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

DETAILED DESCRIPTION OF THE PREFERRED EMBODIMENTS

Figure 1:
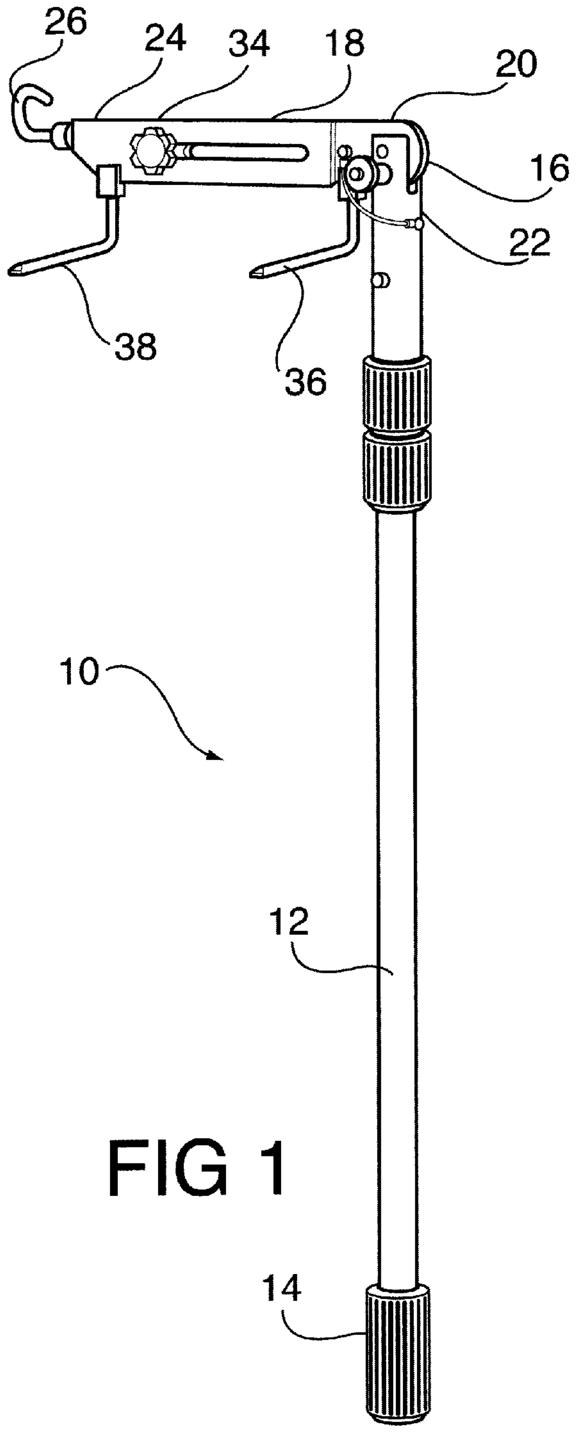
FIG. 1 is a front perspective view of the remote anchorage tool of my invention.

Referring now to the drawings in detail wherein like reference numerals have been used throughout the various figures to designate like elements, there is shown in FIGS. 1-8 a remote anchorage installation tool constructed in accordance with the principles of the present invention and designated generally as 10.

The remote anchorage installation tool 10 is comprised of several component parts including an elongated vertically extending pole 12 having a lower handle portion 14 and an upper end 16. The pole 12 is preferably capable of telescoping from a length of 10 or 20 feet to 40 or 50 feet or more. Telescoping poles are, of course, well known in the art and the details thereof and the manner in which they operate are not believed to be necessary for an understanding of the present invention.

Figure 2:
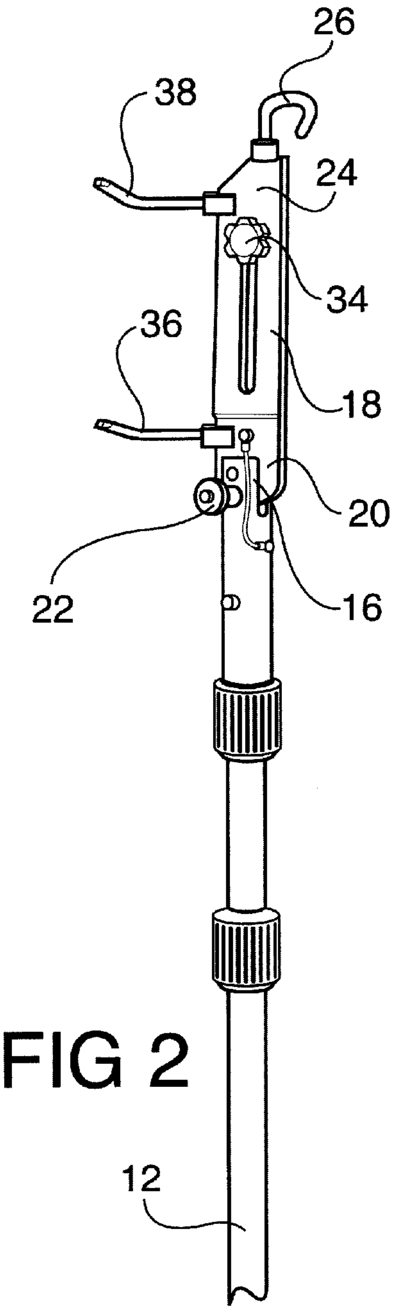
FIG. 2 is a front perspective view similar to FIG. 1 but showing the adapter at the top thereof in a second position.

An elongated adapter 18 has a first end 20 pivotally attached to the upper end 16 of the pole 12. By removing the locking pin 22, the adapter 18 can be pivoted between a first position as shown in FIG. 2 where it is in substantial axial alignment with the pole 12 and a second position as shown in FIGS. 1-5 where it is substantially perpendicular to the pole 12. In the perpendicular position shown in FIGS. 1-5, the pole 12 and adapter 18 define a plane. The locking pin 22 is used to lock the adapter 18 into either the first position or second position.

The adapter 18 also includes a second or free end 24. Extending outwardly from the free end 24 is a hook 26. The hook 26 extends so as to be essentially in axial alignment with the main body portion of the adapter 18.

The adapter 18 is preferably comprised of two elongated parts. As shown in the figures, the adapter includes a front part 28 and a rear part 30. At least one of the two parts includes an elongated slot 32 passing therethrough. A threaded knob 34 holds the two parts together. When the knob 34 is loosened, however, the front part 28 can be slid axially away from or toward the second part 30 so as to make the adapter longer or shorter as required.

A first pin 36 is attached to the second part 30 of the adapter adjacent the first end 20 and extends outwardly therefrom substantially perpendicular to the plane defined by the adapter 18 and the pole 12 when they are in the position shown in FIGS. 1-5. A second pin 38 is secured to the first part 28 of the adapter 18 adjacent the second end 24 thereof and also extends outwardly and perpendicular to the plane. The pins 36 and 38 are parallel to each other but are spaced apart from each other. The distance between the pins 36 and 38 can be adjusted utilizing the knob 34 and the elongated slot 32.

The tool 10 of the invention is utilized to position an anchor 40 over a horizontally extending overhead structural member 42. The structural member 42 may be an overhead rafter or beam or substantially any other structural member. It may be 20, 30, 40, 50 or more feet above the ground or floor.

The anchor 40 is, per se, known in the art. It is comprised of a length of webbing 44 having a first ring 46 at one end thereof and a second 48 at the other. The ring 48 is smaller than the ring 46 and is capable of passing through the ring 46.

Figure 3:
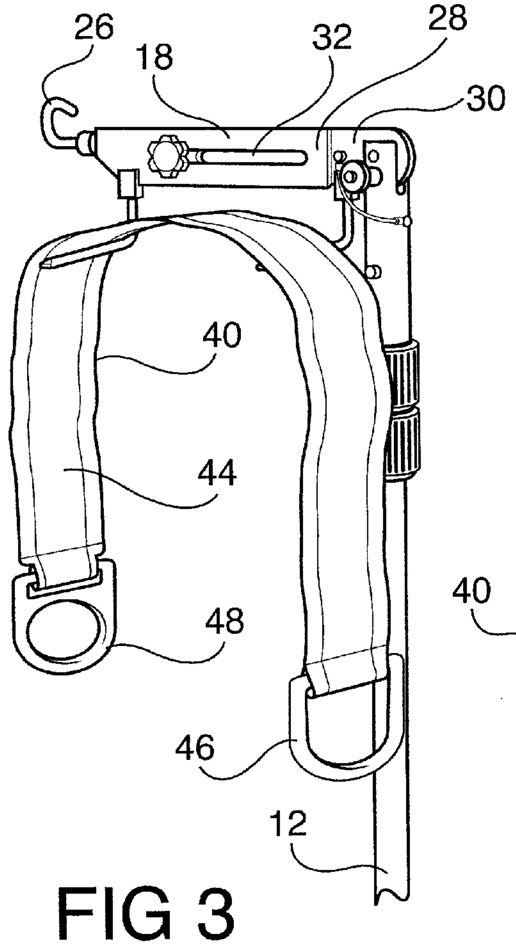
FIG. 3 is a front perspective view similar to FIG. 1 showing the anchor webbing supported by the tool.
Figure 4:
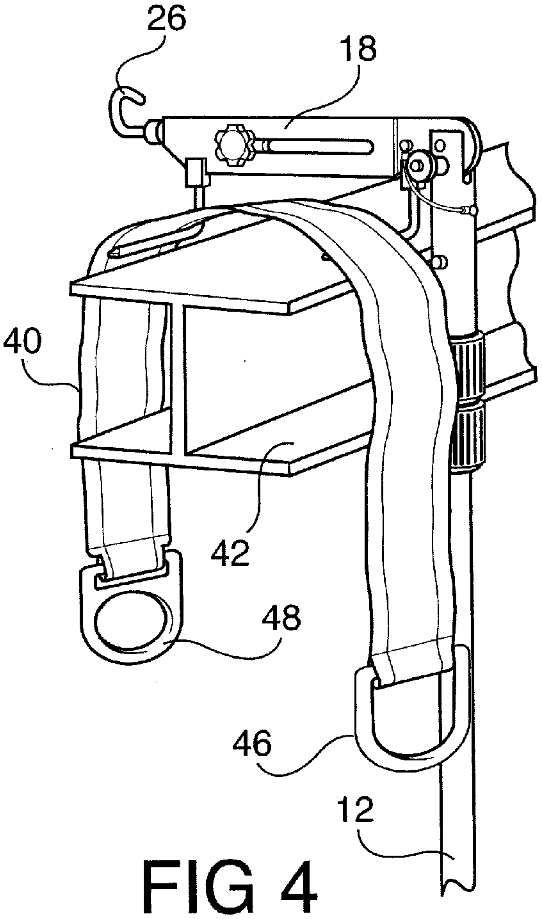
FIG. 4 is a front perspective view showing the tool supporting the webbing above an overhead structural member.
Figure 5:
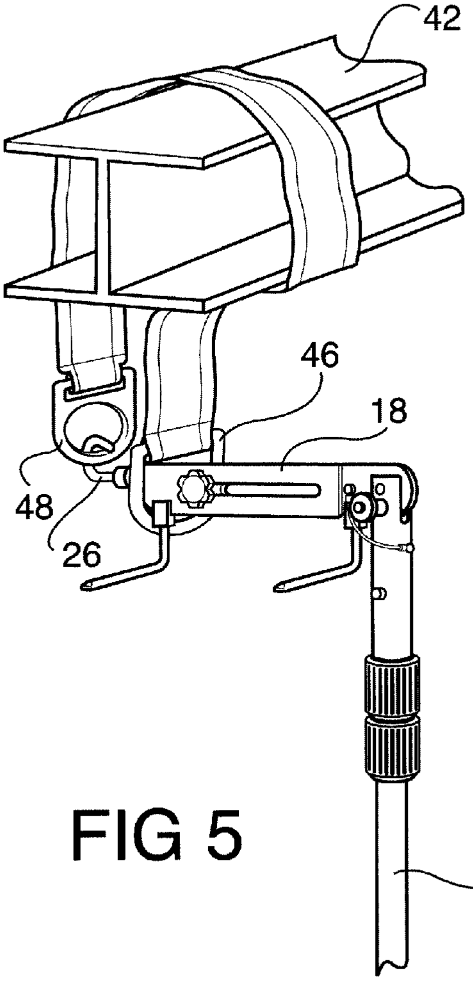
FIG. 5 is a view demonstrating how the tool secures the webbing anchor to the structural member.

The tool 10 of the present invention is utilized in the following manner. With the adapter 18 in the perpendicular position shown in FIG. 1, the webbing 44 of the anchor 40 is placed over the pins 36 and 38 as shown in FIG. 3. The pole 12 is then lifted until the adapter 18, with the anchor 40 thereon, is positioned above the structural member 42 as shown in FIG. 4. Preferably, the pins 36 and 38 are preset to be spaced apart a distance wider than the width of the structural member 42. As a result, when the pole is moved down slightly, the webbing 44 engages the top of the structural member 42 and is lifted off of the 36 and 38, thereby resting on the top of the structural member. Alternatively, the pole 12 can be tilted so that the pins 36 and 38 slant downwardly toward the ground and the webbing 44 will eventually slide off of the pins 36 and 38 onto the structural member 42.

Figure 6:
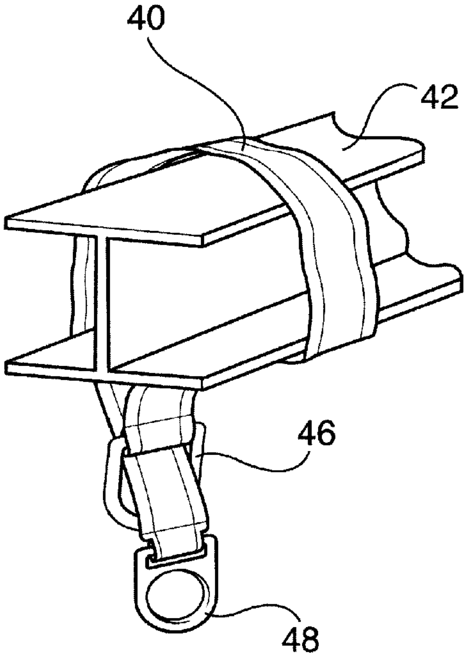
FIG. 6 shows the webbing anchor in place and secured to the structural member.
Figure 7:
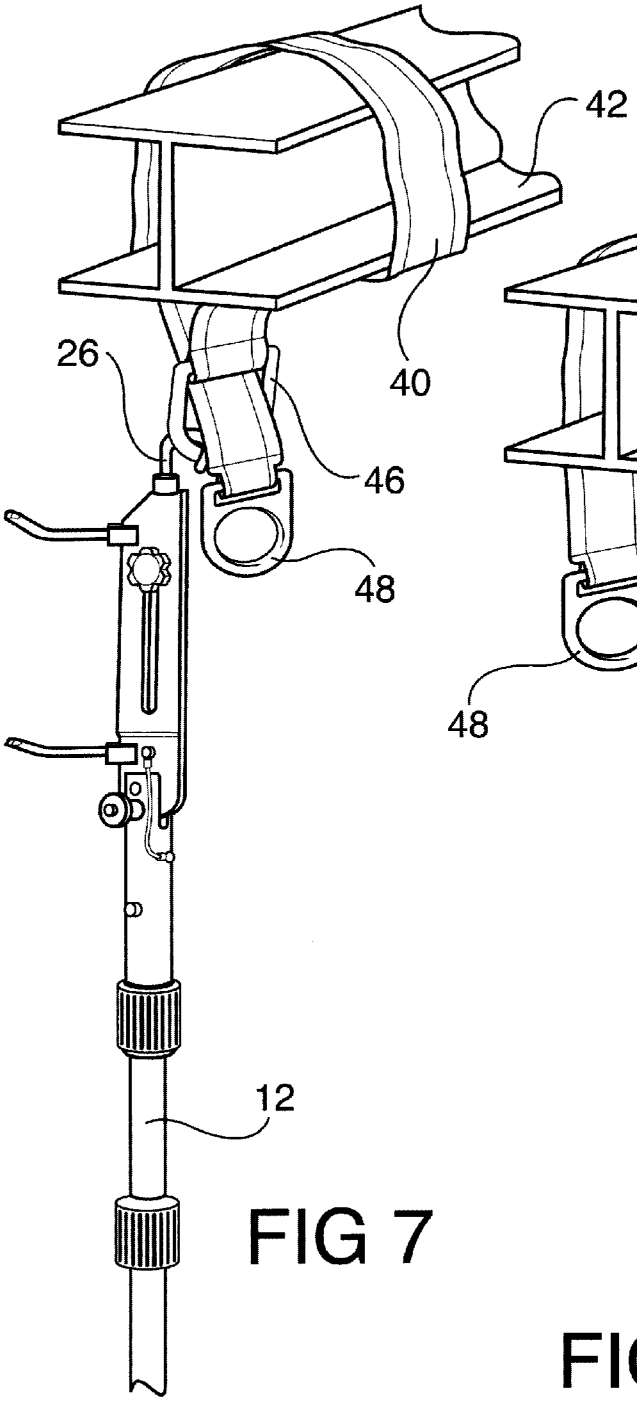
FIGS. 7 and 8 illustrate how the tool is used to remove the webbing anchor from the overhead structural member when it is no longer needed.
Figure 8:
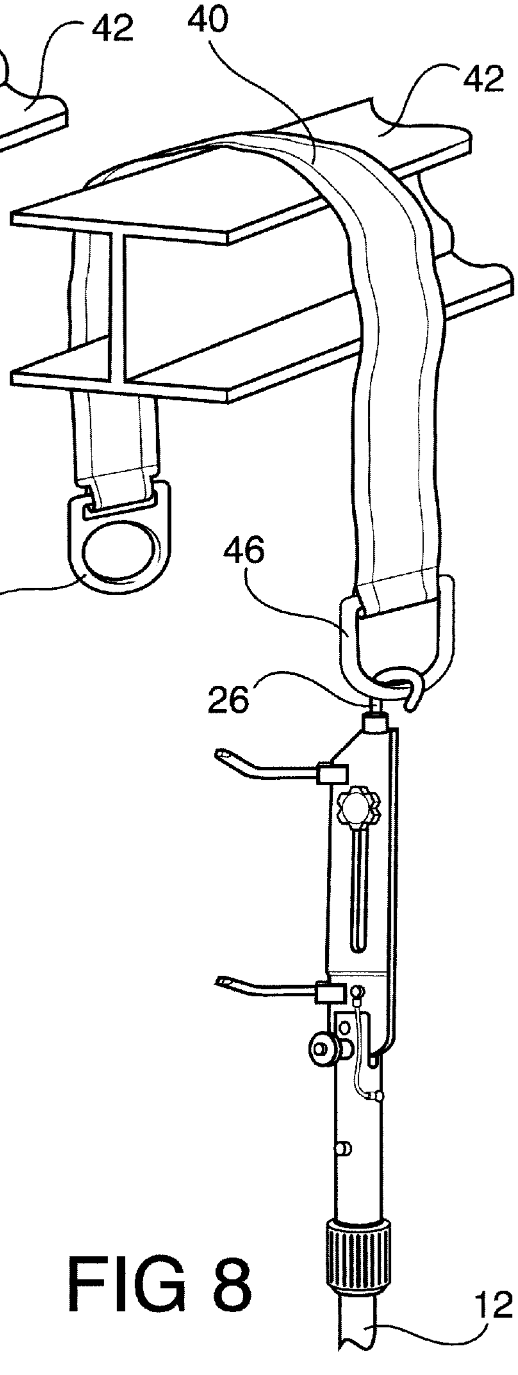

Once the webbing 44 is resting on the structural member 42, the hook 26 is passed through the ring 46 and engages the ring 48. The hook 26 is then backed out through the ring 46 drawing the smaller ring 48 along with it. The ring 48 then becomes the anchor point as shown in FIG. 6.

When it is desired to remove the anchor 40 from the structural member 42, the adapter 18 is moved into its first position as shown in FIG. 2 and locked in that position utilizing the locking pin 22. The hook 26 is then maneuvered to engage the larger ring 46. Pulling down on the tool causes the smaller ring 48 to pass backwardly through the ring 46 and eventually the anchor 40 leaves the structural member 42 and falls to the ground.

The present invention may be embodied in other specific forms without departing from the spirit or essential attributes thereof and accordingly, reference should be made to the appended claims rather than to the foregoing specification as indicating the scope of the invention.

I claim:

1. A tool for setting an anchor at an elevated overhead position over a horizontally extending structural member wherein said anchor includes a length of webbing with a ring at each end, said tool comprising:

a vertically extending pole including a lower handle portion and an upper end;

an elongated adapter having a first end and a second end, said first end being connected to the upper end of said pole and being movable between a first position wherein it is in axial alignment with said pole and a second position wherein it is perpendicular to said pole, said pole and said adapter defining a plane when said adapter is perpendicular to said pole;

a hook extending axially outwardly from said second end of said adapter, said hook being adapted to engage one of said rings, and first and second pins carried by said adapter and extending outwardly from said adapter substantially perpendicular to said plane, said pins being parallel to each other but being spaced apart from each other and being adapted to support said webbing thereon.

2. The tool as claimed in claim 1 including means for changing the space between said first and second pins.

3. A method for setting an anchor at an elevated overhead position over a horizontally extending structural member wherein said anchor includes a length of webbing with a ring at each end including the steps of:

providing a tool comprising a vertically extending pole including a lower handle portion and an upper end, an elongated adapter having a first end and a second end, said first end being connected to the upper end of said pole and being movable between a first position wherein it is in axial alignment with said pole and a second position wherein it is perpendicular to said pole, said pole and said adapter defining a plane when said adapter is perpendicular to said pole, said tool further comprising a hook extending axially outwardly from said second end of said adapter and being adapted to engage one of said rings, and first and second pins carried by said adapter and extending outwardly from said adapter substantially perpendicular to said plane, said pins being parallel to each other but being spaced apart from each other and being adapted to support said webbing thereon;

placing said webbing over said pins with said rings hanging downwardly while said pins are held in a substantially horizontal orientation;

lifting said anchor through the use of said pole over the top of said structural member, and maneuvering said pole and said pins to allow said anchor to come off of said pins so that said webbing lies on top of said structural member and said rings hang downwardly below said structural member.

4. The method as claimed in claim 3 further including the steps of passing said hook through one of said rings, engaging the other of said rings and drawing the other of said rings through said one of said rings.

5. The method as claimed in claim 3 wherein said maneuvering step includes lowering said pole and said pins until said webbing engages the top of said structural member.

6. The method as claimed in claim 3 wherein said maneuvering step includes tilting said pole and said pins to allow said webbing to slide off of said pins to engage the top of said structural member.

* * * * *